(12) United States Patent
Slack

(10) Patent No.: US 8,215,905 B2
(45) Date of Patent: Jul. 10, 2012

(54) METHODS AND APPARATUS FOR ERROR REDUCTION IN ROTOR LOADING MEASUREMENTS

(75) Inventor: Robert Peter Slack, Seattle, WA (US)

(73) Assignee: General Electric Corporation, Schenectady, NY (US)

( * ) Notice: Subject to any disclaimer, the term of this patent is extended or adjusted under 35 U.S.C. 154(b) by 1228 days.

(21) Appl. No.: 12/006,161

(22) Filed: Dec. 31, 2007

(65) Prior Publication Data
US 2009/0169357 A1    Jul. 2, 2009

(51) Int. Cl.
*F03D 7/04* (2006.01)
(52) U.S. Cl. .............................................. 416/1; 416/35
(58) Field of Classification Search ............ 416/35
See application file for complete search history.

(56) References Cited

U.S. PATENT DOCUMENTS

| | | | |
|---|---|---|---|
| 4,532,461 A | 7/1985 | Crook | |
| 5,226,805 A | 7/1993 | Proven | |
| 6,619,918 B1 | 9/2003 | Rebsdorf | |
| 6,726,439 B2 | 4/2004 | Mikhail et al. | |
| 6,888,262 B2 | 5/2005 | Blakemore | |
| 6,940,186 B2 | 9/2005 | Weitkamp | |
| 7,004,724 B2 | 2/2006 | Pierce et al. | |
| 7,086,834 B2 * | 8/2006 | LeMieux | 416/1 |
| 7,095,129 B2 | 8/2006 | Moroz | |
| 7,160,083 B2 | 1/2007 | Pierce et al. | |
| 2006/0140761 A1 | 6/2006 | LeMieux | |
| 2007/0057517 A1 | 3/2007 | McNerney | |

FOREIGN PATENT DOCUMENTS
EP    0477948 A2    4/1992

OTHER PUBLICATIONS

European Search Report and Written Opinion issued in connection with application EP 08171652.4, Dec. 17, 2010.

* cited by examiner

*Primary Examiner* — Richard Edgar
(74) *Attorney, Agent, or Firm* — James McGinness; Armstrong Teasdale LLP

(57) ABSTRACT

A method for correcting offsets in sensors includes mounting, on a rotating machine, a first set of sensors in locations selected to measure vector loads in a first set of coordinates. The method further includes mounting, on the rotating machine, a second set of sensors in locations selected to measure vector loads in a second set of coordinates, wherein the first set of coordinates and the second set of coordinates rotate with respect to one another when the rotating machine is operating. The method also includes utilizing measurements from either or both of the two sets of sensors to correct offset errors in vector loads measured by the other set of sensors.

20 Claims, 7 Drawing Sheets

METHODS AND APPARATUS FOR ERROR REDUCTION IN ROTOR LOADING MEASUREMENTS

BACKGROUND OF THE INVENTION

This invention relates generally to reduction of fatigue in rotating machine components and, more particularly, to methods and apparatus for accurate and reliable measurements of rotor loading. The methods and apparatus are particularly useful for wind power generation but are not necessarily limited thereto.

Utility grade wind turbines (i.e., wind turbines designed to provide electrical power to a utility grid) can have large rotors (e.g., 30 or more meters in diameter). Asymmetric loading across these rotors occurs due to vertical and horizontal wind shears, yaw misalignment, and turbulence. These asymmetric loads contribute to extreme loads and the quantity of fatigue cycles on the rotor blades and other wind turbine components.

Accurate measurement of rotor loads acting on electrical machines, such as wind turbines, is a necessary precursor to reduction of fatigue and extreme loads. Currently known methods for measurement of bending moment components of these loads at an upwind end of a main shaft are susceptible to zero-point offset shifts arising from sensor drift over time, sensor drift with temperature, and material deformations that occur in differing operational states. At least one known calibration strategy defines zero-point offsets in an idle operational state with a single yaw position, whereas control of asymmetric loads occurs during full and near full load operation with significant time delay, possible temperature change, far more thrust load and changing yaw orientation. The difference in operating state between system calibration events and active control events can result in false incorporation of offset shifts into the measurements of bending moment. Outcomes can range from sub-optimal load reduction to increased fatigue and extreme loads. Measurements can thus be susceptible to offset changes from several sources, including but not limited to unforeseen modes of mild deformation in each machine's bedplate.

The use of sensors to measure rotor loads as bending moment in the main shaft of a wind turbine is known. For example, see U.S. Pat. No. 7,160,083, entitled "Method and apparatus for wind turbine rotor load control," issued to Pierce et al. and assigned to the assignee of the present invention or a related company.

Known embodiments of sensors measuring rotor loads are susceptible to offset errors in their home coordinate systems (i.e., offsets in the bending moments in the coordinate system with which the physical sensors rotate), arising from different operational states, thrust load, time, and/or temperature.

For example, strain gauges in blades have been used as sensors fixed to the Germanischer Lloyd (GL) chord coordinate system. Strain gauge pairs located 1.5 meters from each blade root have been used in measurement campaigns to calculate $M_{YR}$, $M_{ZR}$, $M_{YN}$ (D) and $M_{ZN}$ (Q) moments. This measurement technique requires two sets of coordinate transformations to arrive at fixed frame ($M_{YN}$, $M_{ZN}$) bending moments. Relative zero-point offset errors in the strain gages can result in constant offsets to values in the rotating frame moments ($M_{YR}$, $M_{ZR}$) which are in the home coordinate system of the aggregate set of sensors.

BRIEF DESCRIPTION OF THE INVENTION

In one aspect, a method for correcting offsets in vector load measurement signals is provided. The method includes mounting, on a rotating machine, a first set of sensors in locations selected to measure vector loads in a first set of coordinates. The method further includes mounting, on the rotating machine, a second set of sensors in locations selected to measure vector loads in a second set of coordinates, wherein the first set of coordinates and the second set of coordinates rotate with respect to one another when the rotating machine is operating. The method also includes utilizing measurements from either or both of the two sets of sensors to correct offset errors in bending moments measured by the other set of sensors.

In another aspect, an apparatus for determining a vector load in a rotating machine is provided. The apparatus includes a first set of sensors configured for mounting on locations of the rotating machine selected for measuring vector loads in a first set of coordinates. The apparatus also includes a second set of sensors configured for mounting on locations of the rotating machine selected for measuring vector loads in a second set of coordinates, wherein the first set of coordinates and the second set of coordinates rotate with respect to one another when the rotating machine is operating. The apparatus further includes a controller configured to utilize vector load measurements from either or both the first set of sensors and the second set of sensors to correct offset errors in vector loads measured by the other set of sensors.

In yet another aspect, a wind turbine is provided. The wind turbine includes a nacelle, an electrical generator inside the nacelle, and a rotor having at least one blade operatively coupled to the electrical generator. The wind turbine also includes a first set of sensors mounted on the wind turbine at locations selected for measuring vector loads in a first set of coordinates and a second set of sensors mounted on the wind turbine at locations for measuring vector loads in a second set of coordinates. The second set of coordinates rotates with respect to the first set of coordinates when the wind turbine is operating. The wind generator also includes a controller configured to use vector load measurements from either or both the first set of sensors and the second set of sensors to correct offset errors in vector loads measured by the other set of sensors.

It will be appreciated that some embodiments provide a correction for constant errors in measured vector loads of a rotating machine, such as a wind turbine. As such, a controller may have available more accurate measurements for determining what corrective action to take in the event of an undesirable vector load on the rotating machine.

Figure 1:
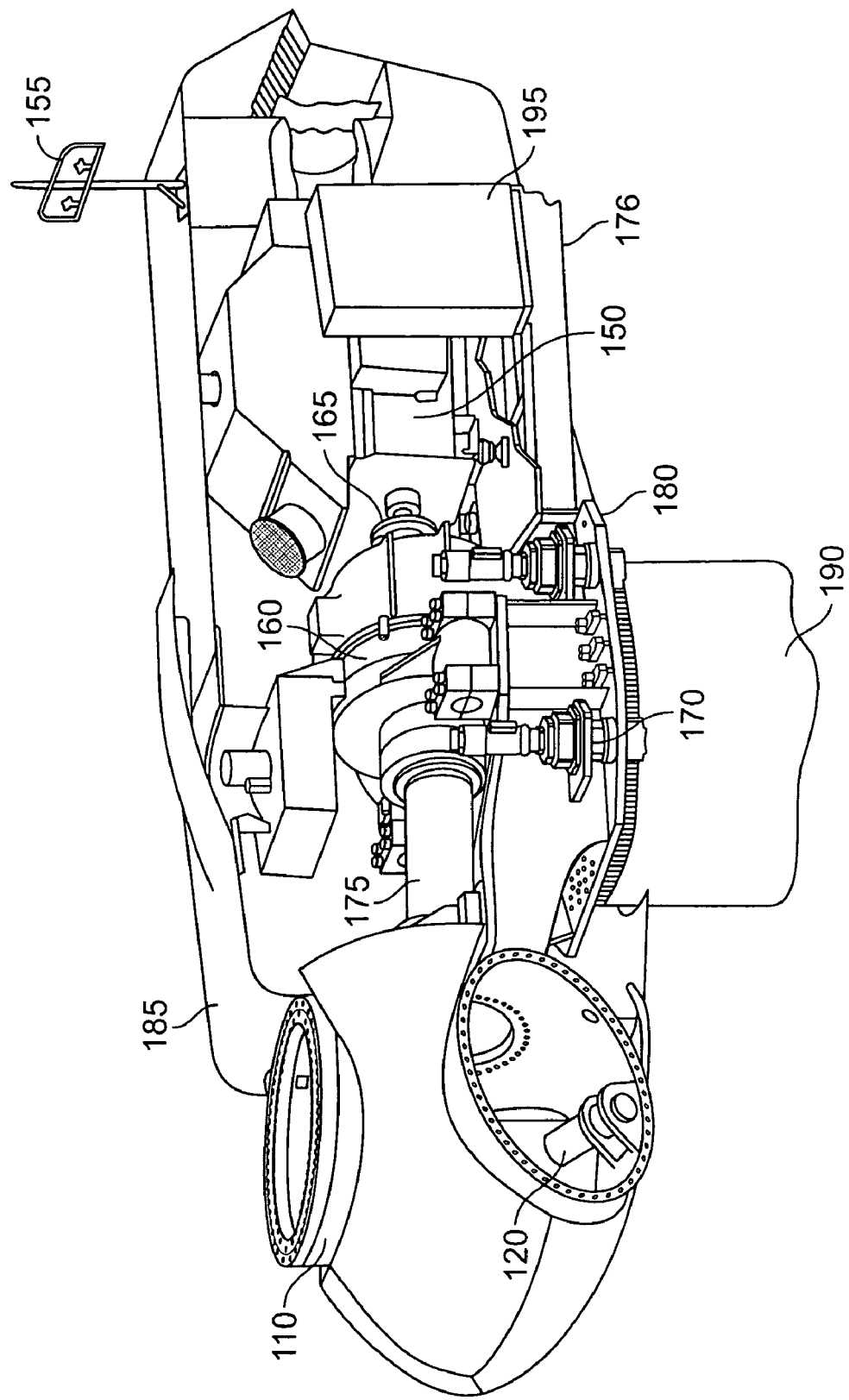
FIG. 1 is cut-away perspective view of an exemplary nacelle of a wind turbine.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION OF THE INVENTION

FIG. 1 is a portion of an exemplary wind turbine. The components shown in FIG. 1, except for rotor hub 110, are typically housed in a nacelle 185 atop a tower 190. The height of tower 190 can be selected based on factors and conditions well-known in the art. In one embodiment, wind turbine components include a distributed microcontroller-based control system including control panel 195. In such embodiment, multiple microcontrollers (not shown in FIG. 1) are used for overall system monitoring and control including pitch and speed regulation, high-speed shaft and yaw brake application, yaw and pump motor application and fault monitoring. Alternative distributed or centralized control architectures can also be used. Without loss of generality, control panel 195 includes a turbine controller 210 described in detail below with reference to FIG. 2.

In one embodiment, the control system provides control signals to pitch drive 120 to control the pitch of blades (not shown in FIG. 1) that drive rotor hub 110 as a result of aerodynamic forces on the blades. In one embodiment three blades are coupled to rotor hub 110. However, any suitable number of blades may be coupled to rotor hub 110 in alternative embodiments. In one embodiment, the pitch of the blades can be individually controlled by pitch drive 120. Rotor hub 110 and the turbine blades combine to form a wind turbine rotor.

A turbine drive train includes rotor shaft 175 connected to rotor hub 110 and gear box 160 that, in one embodiment, drives a high speed shaft enclosed within gear box 160. The high speed shaft is used to drive generator 150. In one embodiment, generator 150 is mounted on main frame 176. In one embodiment, rotor torque is transmitted through a torque limiting coupling 165. Other types of generators, for example, wound rotor induction generators, can also be used. Yaw drive 170 and yaw deck 180 provide a yaw control system for the wind turbine. In one embodiment, the yaw control system is electrically operated and controlled by the control system based on information received from wind vane 155 mounted on nacelle 185.

Proximity sensors determine a deflection of a shaft flange from a predetermined resting or no load position. The shaft flange is positioned around a portion of rotor shaft 175 exiting from rotor hub 110. Using data from the proximity sensors, a turbine controller can determine the loads on the blades that caused the deflection detected by the proximity sensors. With this information, the turbine controller can cause the pitch of the blades to be changed to reduce the load on the blades or to reduce the asymmetrical nature of the loads (i.e., to cause a more symmetric load on the rotor).

Figure 2:
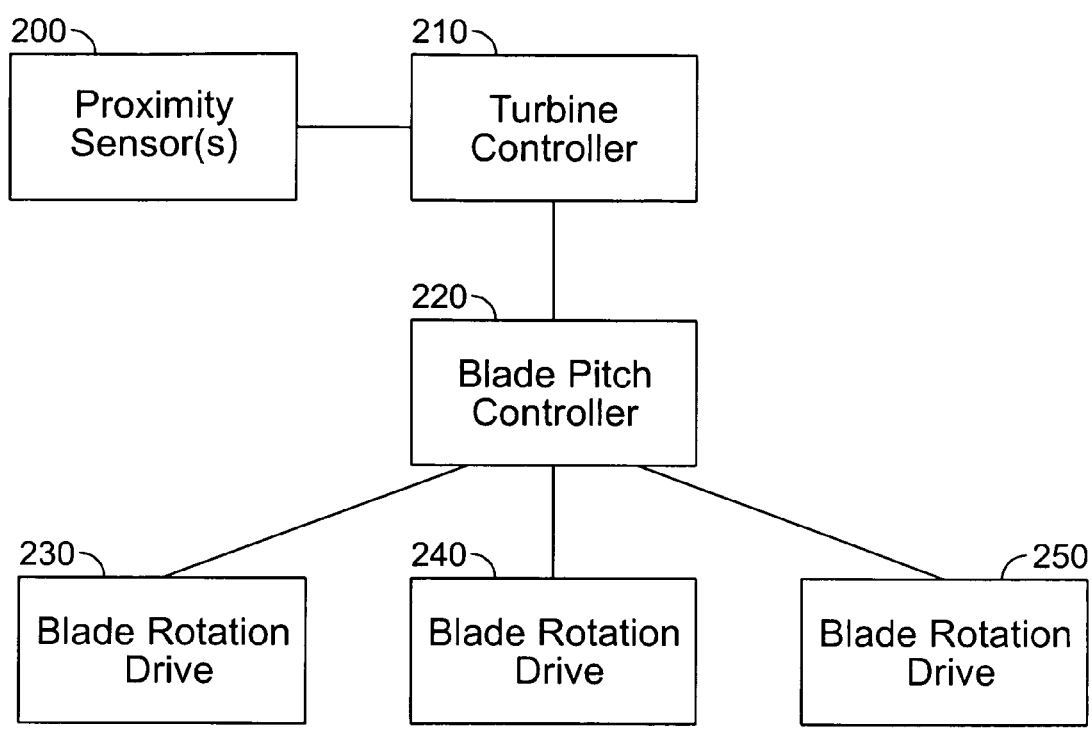
FIG. 2 is a block diagram of an exemplary system to control blade pitch in accordance with sensor measurements.
Figure 3:
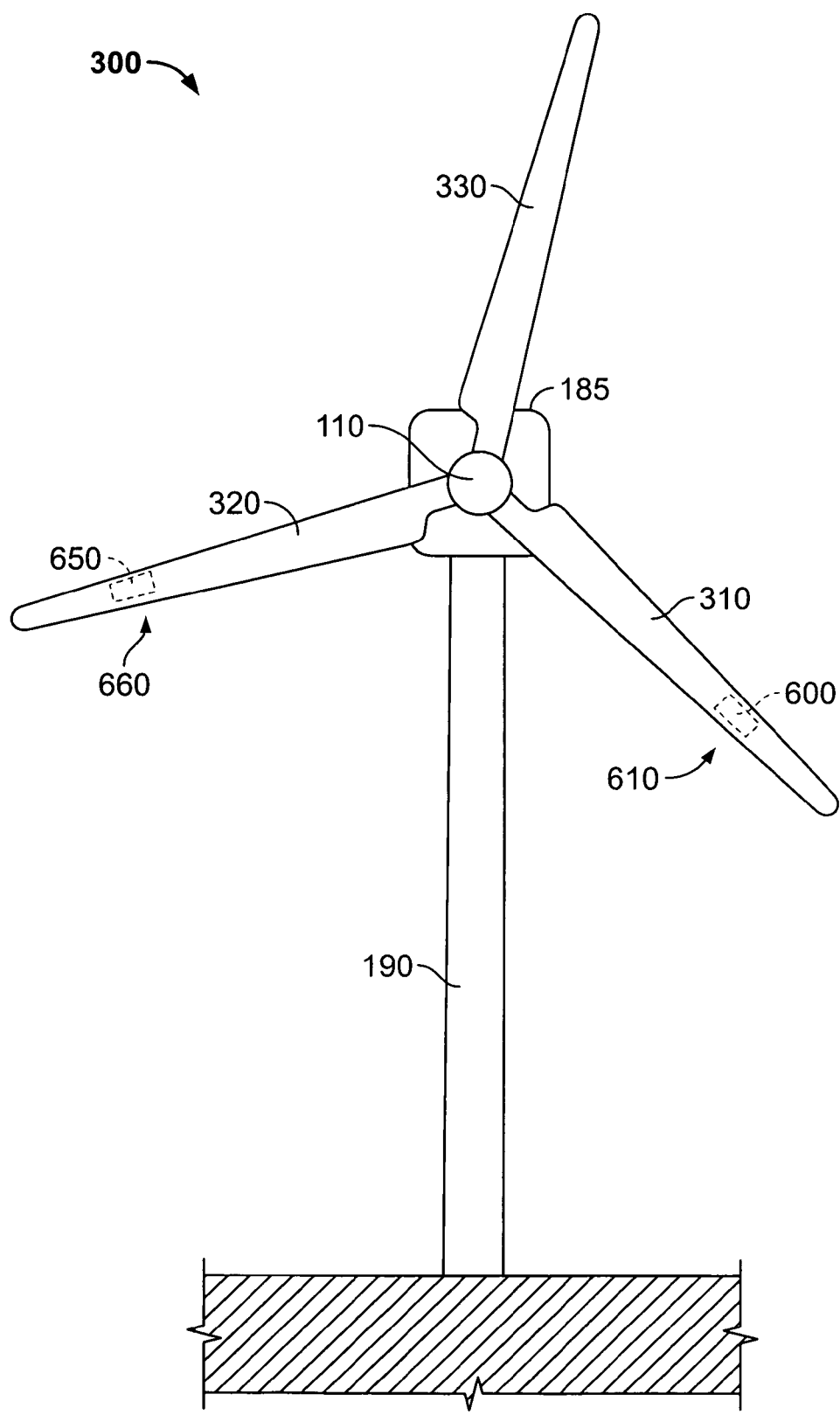
FIG. 3 is a schematic view of a wind turbine energy generator having sensors located in at least one of the rotor blades.

FIG. 2 is a block diagram of a system to control blade pitch based on sensor measurements. One or more proximity sensors and/or any suitable sensors 200 (including but not limited to sensors 500, 550, 600, and 650 shown in FIGS. 3, 4, and 5, and described in detail below) generate signals in response to deflection of wind turbine components, for example, the main shaft flange. Turbine controller 210 is coupled in signal communication with sensors 200 to receive the signals generated by sensors 200. Turbine controller 210 analyzes the signals to determine the forces that caused the deflection of the turbine component.

In one embodiment, turbine controller 210 includes a processor that receives signals (either analog or digital signals) that indicate the output of sensors 200. The processor can be, for example, a general purpose processor that executes instructions, a hardwired control circuit, or a combination of a general purpose processor and hardwired circuitry. In response to the signals received from sensor(s) 200, turbine controller 210 generates control signals that are transmitted to blade pitch controller 220.

Blade pitch controller 220 is coupled to one or more blade rotation drives, 230, 240, and 250, that control a pitch of the corresponding blade of the wind turbine. By varying the pitch of the blades, a magnitude and/or a duration of loads placed on the wind turbine components can be reduced, thereby improving the overall performance of the wind turbine.

In one embodiment, for feedback control, input signals represent a blade azimuth position (for all blades), a speed of low-speed shaft, and a generator output (in this embodiment, feedback control is only used at near-rated and above-rated conditions, although it may be used at all conditions in alternative embodiments). Rotor azimuth and low-speed shaft speed may be obtained using, for example, a rotary encoder that produces pulses from the low-speed shaft rotation and a single reset pulse at a known rotor azimuth. In some configurations, shaft speed may be obtained by counting bolts, notches, and/or a sensible pattern rotating on a member connected to the shaft.

In the exemplary embodiment, two sets of sensors, each of which detects or may be processed to accurately represent a bending moment (as two perpendicular components) at the same axial coordinate along the main shaft to within a close tolerance. These two sensor sets physically rotate relative to one another. For instance, a first set of sensors is mounted in rotating coordinates (the Gemmanischer Lloyd [GL] rotor, the GL blade, or the GL chord coordinate system) while a second set of sensors is nacelle-fixed (GL hub coordinates). Signals from strain gauges in one or more blades and proximity sensors at a main shaft flange are suitable on many machines, as both measurements, properly scaled, closely reflect the bending moment at the junction of the main shaft and the hub. The set of strain gauges in the blades is in a rotating coordinate system, whereas the set of proximity sensors at the main shaft flange is in a nacelle-fixed coordinate system. Each set of sensors is susceptible to constant offset errors in its own coordinate system, but not to constant offset errors in the coordinate system of the other set of sensors. Thus, in one embodiment, each set of sensors is used to correct offset errors in the other set of sensors. In certain embodiments, the offset correction is performed during operation while also updating scaling correction factors. Perpendicular components of the bending moment in each coordinate system approach alignment with one another at certain points in a revolution of the rotor and diverge from alignment at other times. These points of alignment and negative alignment are advantageously used in certain embodiments. A system of moving averages, such as at least two to three rotor revolutions, is used to update offset correction factors for each system. Once appropriate scaling to a system of units is applied to at least one set of sensors (one bending moment perpendicular component), the rest of the scales and all offsets can then be determined.

Thus, in one embodiment, an apparatus is provided for determining a rotating bending moment in a rotating machine. One example of such a machine is wind turbine 300 illustrated in FIG. 3. The apparatus includes a first set of sensors 500 and 550, shown in FIGS. 4 and 5, respectively, that are configured for mounting on locations 510 and 560, respectively, of wind turbine 300. Locations 510 and 560 are selected for measuring bending moments in a first set of coordinates 515 shown in FIG. 6. The apparatus also includes a second set of sensors 600 and 650, shown in FIG. 3, that are configured for mounting on locations 610 and 660, respectively, of the rotating machine. Locations 610 and 660 are selected for measuring bending moments in a second set of coordinates 615 shown in FIG. 6. For example, location 610 is selected on a portion of blade 310 of wind turbine 300, while location 660 is selected on a portion of blade 320 of wind turbine 300. The first set of coordinates 515 and the second set of coordinates 615 rotate with respect to one another with wind turbine 300 operating. Wind turbine 300 shown in FIG. 3 also has a third blade 330, to illustrate a three-bladed wind turbine, although wind turbine 300 may include any suitable number of blades. Although not shown in FIG. 3, in many configurations of wind turbine 300, a sensor set is provided for each blade.

Figure 4:
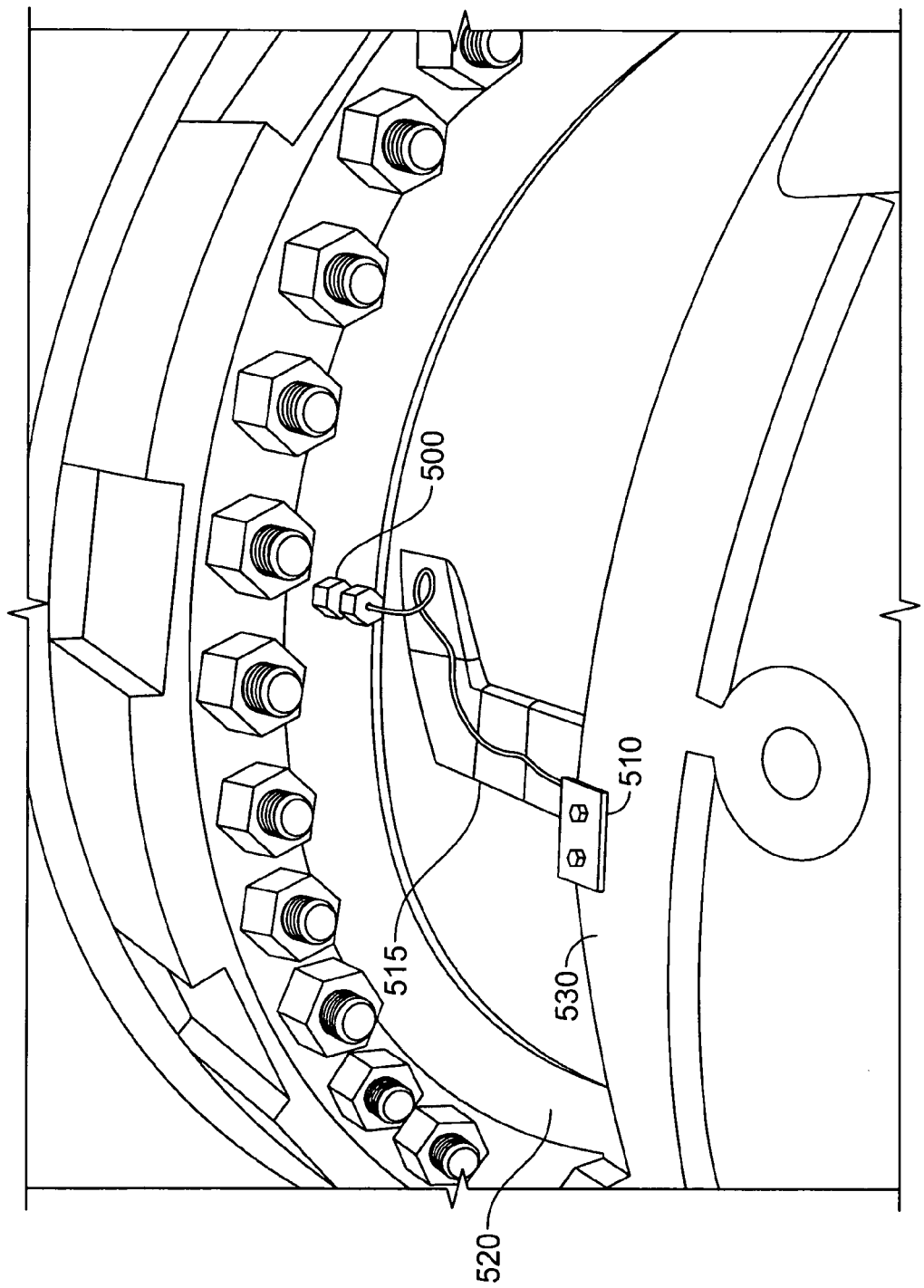
FIG. 4 is a perspective view of a first proximity sensor facing a main shaft flange from a view facing a hub.
Figure 5:
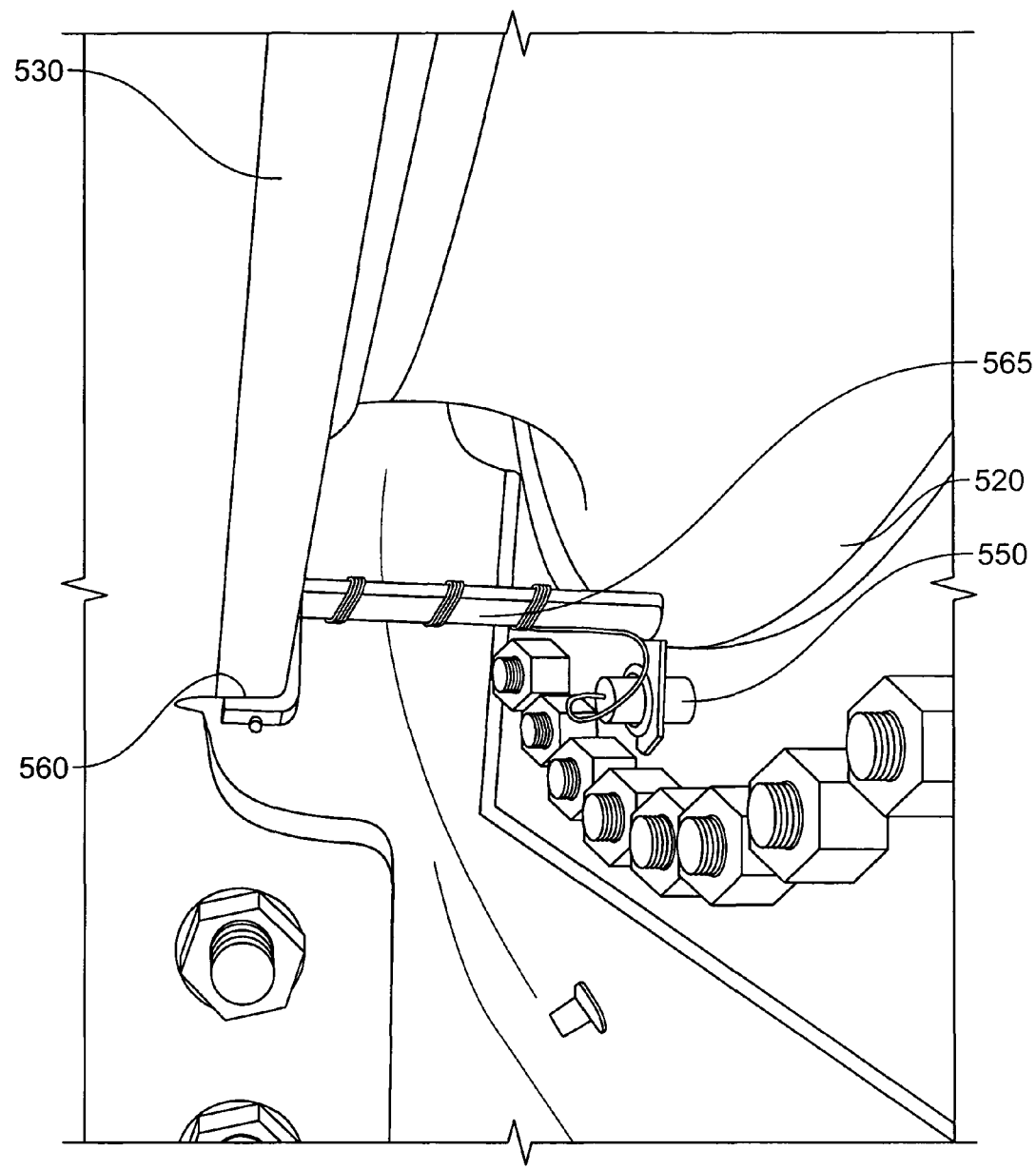
FIG. 5 is a perspective view of a second proximity sensor facing the main shaft flange at a 90° angle with respect to the first proximity sensor.

More particularly, FIG. 4 shows a first proximity sensor 500 facing main shaft flange 520 from a view facing the hub. As shown in FIG. 4, proximity sensor 500 is connected to a sensor bracket 516 that is connected between main shaft flange 520 and a main bearing 530. In alternative embodiments, other suitable connection techniques may be used at any suitable location. Proximity sensor 500 may be any suitable sensor known in the art. Sensor 500 detects motion of main shaft flange 520 in one direction. A second proximity sensor 550, shown in FIG. 5, allows a turbine controller 210 to determine deflection of main shaft flange 520 in three dimensions and thereby determine the loads on various turbine components that caused the deflection. In the embodiment shown in FIG. 5, proximity sensor 550 is facing main shaft flange 520 at about a 90 degree angle with respect to first proximity sensor 500 and is positioned in a plane that is orthogonal to a plane in which sensor 500 is positioned. In one embodiment, sensor bracket 565 is connected between main shaft flange 520 and main bearing 530. However, any suitable connection in any suitable position may be used in alternative embodiments. Although not shown in FIG. 5, in many embodiments of the present invention, two proximity sensor pairs are used 90 degrees apart from one another.

Additional sensors are used in another coordinate system to determine deflection of components other than the main shaft flange. For example, one or more of blades 310, 320, and 330 of wind turbine 300 have a proximity sensor 600, 650 to sense forces on the corresponding blade. The proximity sensors in the blades are also coupled to turbine controller 210.

Turbine controller 210 is configured, such as by using software, firmware, and/or special purpose processors or components, to utilize bending moment measurements from one of the two sets of sensors to correct offset errors in bending moments measured by the other set of sensors and to further control operation of wind turbine 300 (for example, by controlling blade pitch in wind turbine 300). As used herein, the term bending moment measurements is intended to include within its scope not only direct measurements of bending moments, but also proxy measurements, i.e., indirect measurements relating to bending moments, such as proximity and displacement measurements, from which bending moments can be derived.

In certain embodiments, wind turbine 300 includes nacelle 185, and locations 510 and 560 of sensors 500 and 550 are selected to measure bending moments in a rotor-based coordinate system, and locations 610 and 660 of sensors 600 and 650 are selected to measure bending moments in a nacelle-fixed coordinate system.

Controller 210 can be further configured, in certain embodiments, to utilize aligned (parallel) components of the bending moment at predetermined angles of revolution of a rotor of wind turbine 300 to correct for a constant offset in measured bending moments. In alternative embodiments, controller 210 is configured to utilize long term averages of about 10 minutes or longer to update correction factors for each set of sensors. Further, in certain embodiments, controller 210 is configured to determine offsets once for each 90 degrees of a revolution of a rotor of the rotating machine. Further, controller 210 may be configured to filter and/or determine a running average of signal offsets to dampen oscillations in a presence of random noise. A simple lag filter is used in one embodiment.

In one embodiment, scales flow from one perpendicular component of a bending moment to the other three. Offsets are accurately removed when the scales of all signals are correct. Thus, in one embodiment, two functions are allowed to operate simultaneously and/or the offset removal is delayed until changes in scale correction factors are small, which indicates convergence. Scale correction factors are determined through comparison of a variation between each sensor set when the sensor sets are orthogonally aligned. For example, if an initially scaled first component of a bending moment is nacelle-fixed, then scaling corrections for the rotating components in certain embodiments are set from historical values compiled while the rotating components are in and out of alignment with the first component. The scale of a second component of the bending moment in the nacelle-fixed frame is set from a comparison with each rotating component as it falls in and out of alignment. Scaling corrections are updated such that three measurement quantities (for instance, $M_{ZN}$, $M_{YR}$, and $M_{ZR}$) match the sensitivity of the fourth measurement quantity (for instance, $M_{YN}$). Historical values are compiled for each orthogonal alignment of sensors and a regression is performed on each moving data set using any suitable regression method. Each scale correction value is initialized to one and updated using a filter such that the scale correction value gradually converges to the proper magnitude and sign. More particularly, in some embodiments of the present invention, a regression of historical measurements in positions of orthogonal alignment is used to bring perpendicular moment measurements to essentially equal sensitivity. Also, in some embodiments, vector measurements are compared in a common reference frame to determine convergence of the offset correction and the sensitivity adjustment.

Offsets are evaluated in certain embodiments using matrices of equations relating GL bending moments in the nacelle-fixed coordinate system and the rotating coordinate system. Relative zero-point offsets in either set of sensors do not result in any sinusoidal error in home coordinate system quantities. The same relative zero-point offsets result in a sinusoidal error in the coordinate system of the other set of sensors, with a negligible constant offset when taken over a large number of rotations (provided the rotational rate is essentially steady). Derivation of one set of such equations which uses only orthogonally-aligned rotor positions is provided below. These equations are used to solve for each signal offset at intervals of 90 degrees of rotor rotation. Subsequent solution values are passed through a filter or running average to dampen any oscillation tendency that can exist as a result of random noise in the measurement signals.

A definition of the offset present in each signal is measured value (with offset error)+offset=actual value, as defined by the following equations, wherein $M_{AT}^{MTX}$ represents a moment, AT indicates the type of axis (the Y axis or the Z axis and whether Rotating or Normal), and MT indicates whether the moment is a measured, an offset, or an actual moment, and if X is present, at which angle X:

$$M_{YR}^{measX} + M_{YR}^{offs} = M_{YR}^{actX} \text{ for all } X \qquad \text{EqA}$$

$$M_{ZR}^{measX} + M_{ZR}^{offs} = M_{ZR}^{actX} \text{ for all } X \qquad \text{EqB}$$

$$M_{YN}^{measX} + M_{YN}^{offs} = M_{YN}^{actX} \text{ for all } X \qquad \text{EqC}$$

$$M_{ZN}^{measX} + M_{ZN}^{offs} = M_{ZN}^{actX} \text{ for all } X. \qquad \text{EqD}$$

Figure 6:
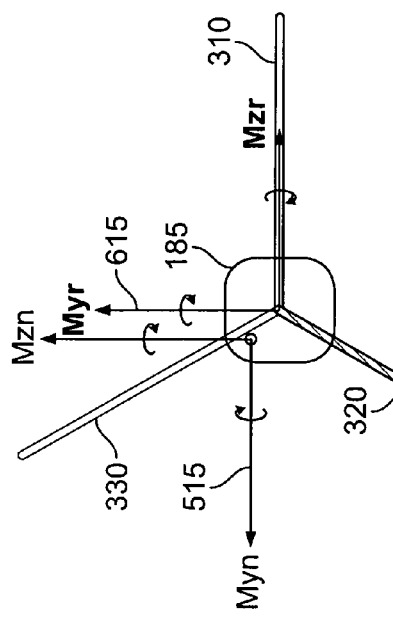
FIG. 6 is a diagrammatic view of a stationary coordinate system and a rotating coordinate system of a wind turbine, with blades shown schematically at an angle of 0°.

At $\phi=0°$, where $\phi$ is an angle of rotation of the rotating axis, which rotates with blades 310, 320, and 330, as shown in FIG. 6:

$$M_{YN}^{act0} - M_{YR}^{act0} = 0 \qquad \text{EqE}$$

$$M_{ZN}^{act0} - M_{ZR}^{act0} = 0 \qquad \text{EqF}$$

$$(M_{YN}^{meas0} + M_{YN}^{offs}) - (M_{YR}^{meas0} + M_{YR}^{offs}) = 0 \qquad \text{Eq1}$$

$$(M_{ZN}^{meas0} + M_{ZN}^{offs}) - (M_{ZR}^{meas0} + M_{ZR}^{offs}) = 0 \qquad \text{Eq2}$$

Figure 7:
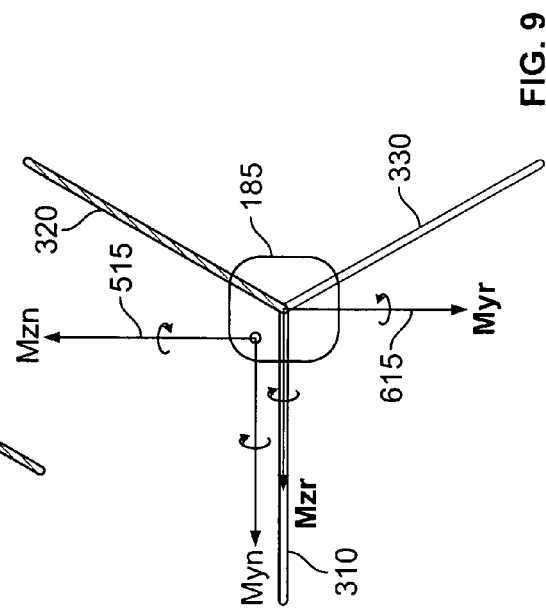
FIG. 7 is a diagrammatic view of a stationary coordinate system and a rotating coordinate system of a wind turbine, with blades shown schematically at an angle of 90°.

At $\phi=90°$, as shown in FIG. 7:

$$M_{YN}^{act90} + M_{ZR}^{act90} = 0 \qquad \text{EqG}$$

$$M_{ZN}^{act90} - M_{YR}^{act90} = 0 \qquad \text{EqH}$$

$$(M_{YN}^{meas90} + M_{YN}^{offs}) + (M_{ZR}^{meas90} + M_{ZR}^{offs}) = 0 \qquad \text{Eq3}$$

$$(M_{ZN}^{meas90} + M_{ZN}^{offs}) - (M_{YR}^{meas90} + M_{YR}^{offs}) = 0 \qquad \text{Eq4}$$

Figure 8:
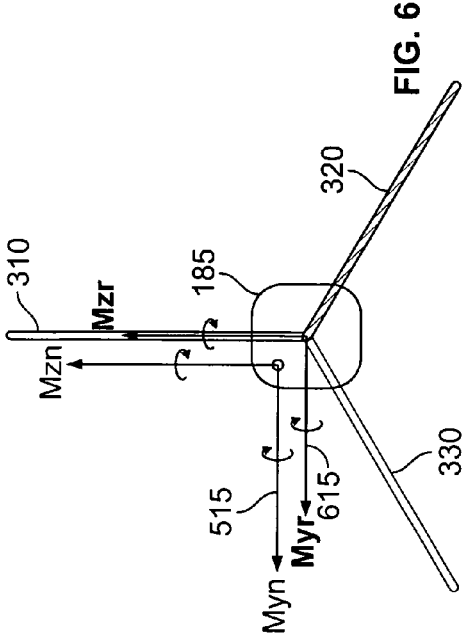
FIG. 8 is a diagrammatic view of a stationary coordinate system and a rotating coordinate system of a wind turbine, with blades shown schematically at an angle of 180°.

At $\phi=180°$, as shown in FIG. 8:

$$M_{YN}^{act180} + M_{YR}^{act180} = 0 \qquad \text{EqI}$$

$$M_{ZN}^{act180} + M_{ZR}^{act180} = 0 \qquad \text{EqJ}$$

$$(M_{YN}^{meas180} + M_{YN}^{offs}) + (M_{YR}^{meas180} + M_{YR}^{offs}) = 0 \qquad \text{Eq5}$$

$$(M_{ZN}^{meas180} + M_{ZN}^{offs}) + (M_{ZR}^{meas180} + M_{ZR}^{offs}) = 0 \qquad \text{Eq6}$$

Figure 9:
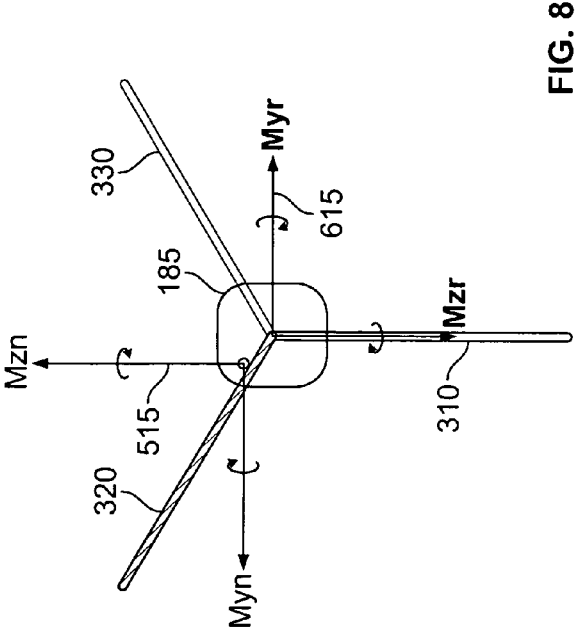
FIG. 9 is a diagrammatic view of a stationary coordinate system and a rotating coordinate system of a wind turbine, with blades shown schematically at an angle of 270°.

At $\phi=270°$, as shown in FIG. 9:

$$M_{YN}^{act270} - M_{ZR}^{act270} = 0 \qquad \text{EqK}$$

$$M_{ZN}^{act270} + M_{YR}^{act270} = 0 \qquad \text{EqL}$$

$$(M_{YN}^{meas270} + M_{YN}^{offs}) - (M_{ZR}^{meas270} + M_{ZR}^{offs}) = 0 \qquad \text{Eq7}$$

$$(M_{ZN}^{meas270} + M_{ZN}^{offs}) + (M_{YR}^{meas270} + M_{YR}^{offs}) = 0 \qquad \text{Eq8}$$

The equations above can be solved in the following manner:

Add Eq1 and Eq5 and rearrange:

$$M_{YN}^{offs} = \frac{M_{YR}^{meas0} - M_{YN}^{meas0} - M_{YR}^{meas180} - M_{YN}^{meas180}}{2} \qquad \text{Eq 9}$$

Subtract Eq1 from Eq5 and rearrange:

$$M_{YR}^{offs} = \frac{M_{YN}^{meas0} - M_{YR}^{meas0} - M_{YN}^{meas180} - M_{YR}^{meas180}}{2} \qquad \text{Eq 10}$$

Add Eq 2 and Eq 6 and rearrange:

$$M_{ZN}^{offs} = \frac{M_{ZR}^{meas0} - M_{ZN}^{meas0} - M_{ZR}^{meas180} - M_{ZN}^{meas180}}{2} \qquad \text{Eq 11}$$

Subtract Eq2 from Eq6 and rearrange:

$$M_{ZR}^{offs} = \frac{M_{ZN}^{meas0} - M_{ZR}^{meas0} - M_{ZN}^{meas180} - M_{ZR}^{meas180}}{2} \qquad \text{Eq 12}$$

Add Eq3 and Eq7 and rearrange:

$$M_{YN}^{offs} = \frac{M_{ZR}^{meas270} - M_{YN}^{meas270} - M_{ZR}^{meas90} - M_{YN}^{meas90}}{2} \qquad \text{Eq 13}$$

Subtract Eq3 from Eq7 and rearrange:

$$M_{ZR}^{offs} = \frac{M_{YN}^{meas270} - M_{ZR}^{meas270} - M_{YN}^{meas90} - M_{ZR}^{meas90}}{2} \qquad \text{Eq 14}$$

Add Eq4 and Eq8 and rearrange:

$$M_{ZN}^{offs} = \frac{M_{YR}^{meas90} - M_{ZN}^{meas90} - M_{YR}^{meas270} - M_{ZN}^{meas270}}{2} \qquad \text{Eq 15}$$

Subtract Eq4 from Eq8 and rearrange:

$$M_{YR}^{offs} = \frac{M_{ZN}^{meas90} - M_{YR}^{meas90} - M_{ZN}^{meas270} - M_{YR}^{meas270}}{2} \qquad \text{Eq 16}$$

What remains are two equations for each of the four offsets, namely, equations Eq9 and Eq13 for $M_{YN}^{offs}$, equations Eq10 and Eq16 for $M_{YR}^{offs}$, equations Eq11 and Eq15 for $M_{ZN}^{offs}$, and equations Eq12 and Eq14 for $M_{ZR}^{offs}$. Each of these constant offsets can thus be determined from one of the two equations. Turbine controller 210 is programmed with these equations. Thus, using sensors that would be considered redundant except for this error, controller 210 determines the error and subtracts it out to develop actual values of a bending moment.

In one embodiment, the latest measured parameter values are used and offset values are recalculated each time a measured parameter value is updated. This procedure allows each offset to be recalculated with every 90 degrees of rotor revolution. It is known that measured values will always contain some random variation (noise), so each recalculation will contain some error as a result of the random noise. However, if a sufficient number of recalculations are aggregated using a moving average or filtering technique, the error in the offset calculations resulting from random noise in the measured parameter values can be correspondingly reduced. To the extent possible, the measured values should not be corrupted with non-random noise, including noise having significant components at odd multiples of the primary rotational frequency.

In certain embodiments, the sensors include at least one strain gauge and at least one proximity sensor. The strain gauge and the proximity sensor need not be in the same set of sensors. For example, any of sensors 500, 550, 600, and 650 may be proximity sensors, and the others may be strain gauges, although mounting details would differ for each type of sensor.

Figure 10:
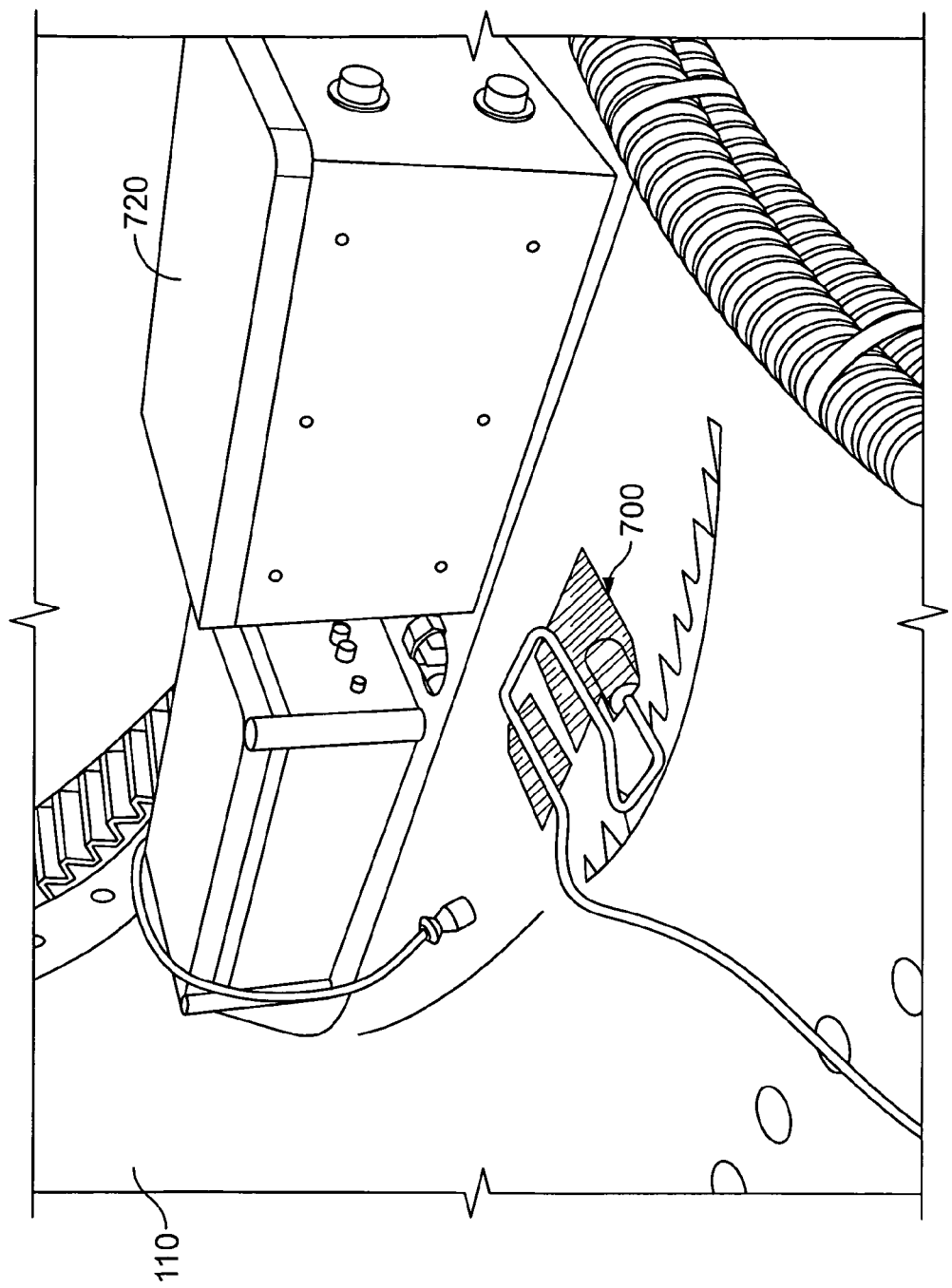
FIG. 10 is a perspective view of a hub having a strain gauge mounted thereon.

More particularly, FIG. 10 shows one embodiment of a hub 110 having a strain gauge. As shown in FIG. 10, a quarter bridge welded strain gauge 700 is located inside hub 110, near a pitch bearing and adjacent to nacelle 185 (shown in FIG. 1). One strain gauge is used for each of three axes in one embodiment. Other suitable locations and/or any suitable number of strain gauges may be used. In one embodiment, data logger 720 is also located inside hub 110 and is configured to acquire data from the strain gauge(s). In at least one embodiment, strain gauges are embedded in hub mounting bolts that reside in a rotating coordinate system. The hub mounting bolts are held fixed to nacelle 185, while the other sensors are held fixed to hub 110. Thus, a first set of sensors is hub-fixed, and a second set of sensors is nacelle-fixed. Also, in one embodiment, main shaft strain gauges are used.

Although the exemplary embodiment described herein provides a method and apparatus for correcting bending moments measured by sensors, it will be appreciated that the techniques described herein are equally useful at correcting any vector load measurement. Such vector load measurements include, but are not limited to, bending moments and shear force vectors. Also, in some embodiments, a rotating set of sensors in the GL rotor coordinate system can be used rather than (or in addition to) blade strain gauges.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. Also, the recitation of the phrase "in an alternative embodiment" or "in certain embodiments" does not necessarily mean that the features of the contrasting embodiments cannot be combined.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

While the invention has been described in terms of various specific embodiments, those skilled in the art will recognize that the invention can be practiced with modification within the spirit and scope of the claims.

What is claimed is:

1. A method for correcting offsets in vector load measurement signals comprising:
   mounting, on a rotating machine, a first set of sensors in locations selected to measure vector loads in a first set of coordinates;
   mounting, on the rotating machine, a second set of sensors in locations selected to measure vector loads in a second set of coordinates, the first set of coordinates rotate with respect to the second set of coordinates with the rotating machine operating; and
   utilizing measurements from either or both the first set of sensors and the second set of sensors to determine and correct, by equations programmed in a controller, offset errors in vector loads measured by the other set of sensors.

2. A method in accordance with claim 1 further comprising using regression of historical measurements in positions of orthogonal alignment to bring perpendicular moment measurements and measurements from the two sets of sensors to essentially equal sensitivity.

3. A method in accordance with claim 2 further comprising comparing vector measurements in a common reference frame to determine offset error correction convergence and sensitivity equalization convergence.

4. A method in accordance with claim 1 wherein the rotating machine is a wind turbine, and the locations of the first set of sensors are selected to measure vector loads in a rotor-based coordinate system, and the locations of the second set of sensors are selected to measure vector loads in a nacelle-fixed coordinate system.

5. A method in accordance with claim 4 wherein said utilizing measurements from the first set of sensors and the second set of sensors further comprises utilizing perpendicular components of the vector load at predetermined angles of revolution of a rotor of the wind turbine to correct for constant offsets in measured vector loads.

6. A method in accordance with claim 4 wherein said utilizing measurements from one of the first set of sensors and the second set of sensors further comprises utilizing running averages of at least 3 rotor revolutions duration to update correction factors for each of the first set of sensors and the second set of sensors.

7. A method in accordance with claim 4 wherein said utilizing measurements from one of the first set of sensors and the second set of sensors further comprises determining offsets once for each 90 degrees of rotor revolution.

8. A method in accordance with claim 7 further comprising at least one of filtering and determining a running average of signal offsets to dampen oscillations in a presence of random noise.

9. An apparatus for determining a vector load in a rotating machine, said apparatus comprising:
   a first set of sensors configured for mounting on the rotating machine at locations selected for measuring vector loads in a first set of coordinates;
   a second set of sensors configured for mounting on the rotating machine at locations selected for measuring vector loads in a second set of coordinates, the second set of coordinates rotate with respect to the first set of coordinates with the rotating machine rotating; and
   a controller programmed with equations which use vector load measurements from either or both the first set of sensors and the second set of sensors to determine and correct offset errors in vector loads measured by the other set of sensors.

10. An apparatus in accordance with claim 9 wherein the rotating machine further comprises a nacelle, and the locations of the first set of sensors are selected to measure vector loads in a rotor-based coordinate system, and the locations of the second set of sensors are selected to measure vector loads in a nacelle-fixed coordinate system.

11. An apparatus in accordance with claim 10 wherein the first set of sensors further comprises at least one strain gauge or at least one proximity sensor.

12. An apparatus in accordance with claim 9 wherein said controller further configured to utilize perpendicular components of a vector load at predetermined angles of revolution of a rotor of the rotating machine to correct for a constant offset in measured vector loads.

13. An apparatus in accordance with claim 9 wherein said controller further configured to utilize running averages of at least two motor revolutions duration to update correction factors for each of the first set of sensors and the second set of sensors.

14. An apparatus in accordance with claim 9 wherein said controller further configured to determine offsets once for each 90 degrees of a rotor revolution of a rotor of the rotating machine.

15. An apparatus in accordance with claim 14 wherein said controller further configured to at least one of filter and determine a running average of signal offsets to dampen oscillations in a presence of random noise.

16. A wind turbine comprising:
a nacelle;
an electrical generator inside the nacelle;
a rotor having at least one blade operatively coupled to the electrical generator;
a first set of sensors mounted on said wind turbine at locations selected for measuring vector loads in a first set of coordinates;
a second set of sensors mounted on said wind turbine at locations selected for measuring vector loads in a second set of coordinates, the second set of coordinates rotate with respect to the first set of coordinates with said wind turbine operating; and
a controller programmed with equations which use vector load measurements from either or both the first set of sensors and the second set of sensors to determine and correct offset errors in vector loads measured by the other set of sensors.

17. A wind turbine in accordance with claim 16 wherein the locations of the first set of sensors are selected to measure vector loads in a rotor-based coordinate system, and the locations of the second set of sensors are selected to measure vector loads in a nacelle-fixed coordinate system.

18. A wind turbine in accordance with claim 17 wherein the first set of sensors includes at least one strain gauge or at least one proximity sensor.

19. A wind turbine in accordance with claim 16 wherein said controller further configured to utilize perpendicular components of a vector load at predetermined angles of revolution of said rotor to correct for a constant offset in measured vector loads.

20. A wind turbine in accordance with claim 16 wherein said controller further configured to determine offsets once for each 90 degrees of a rotor revolution.

* * * * *